UNITED STATES PATENT OFFICE.

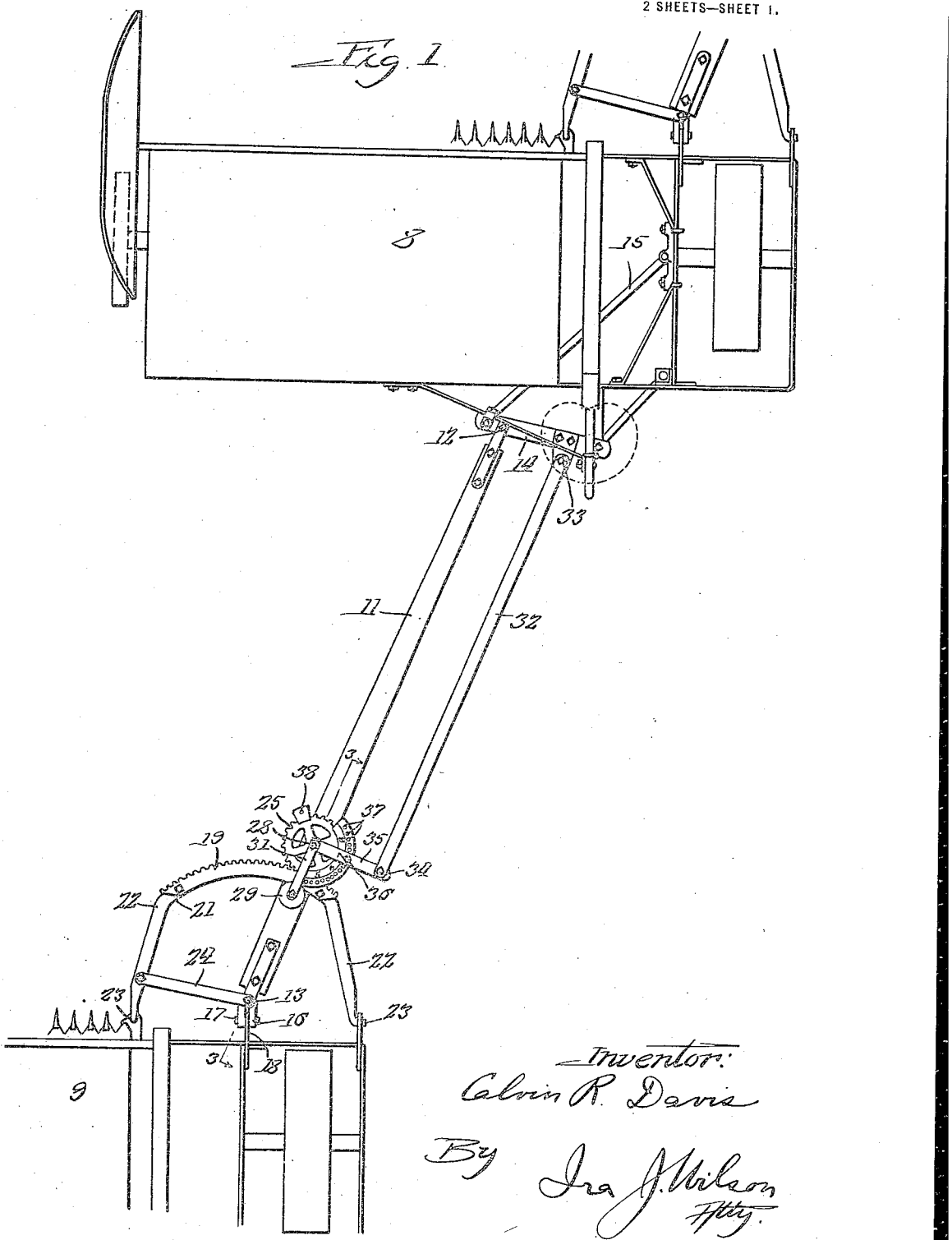

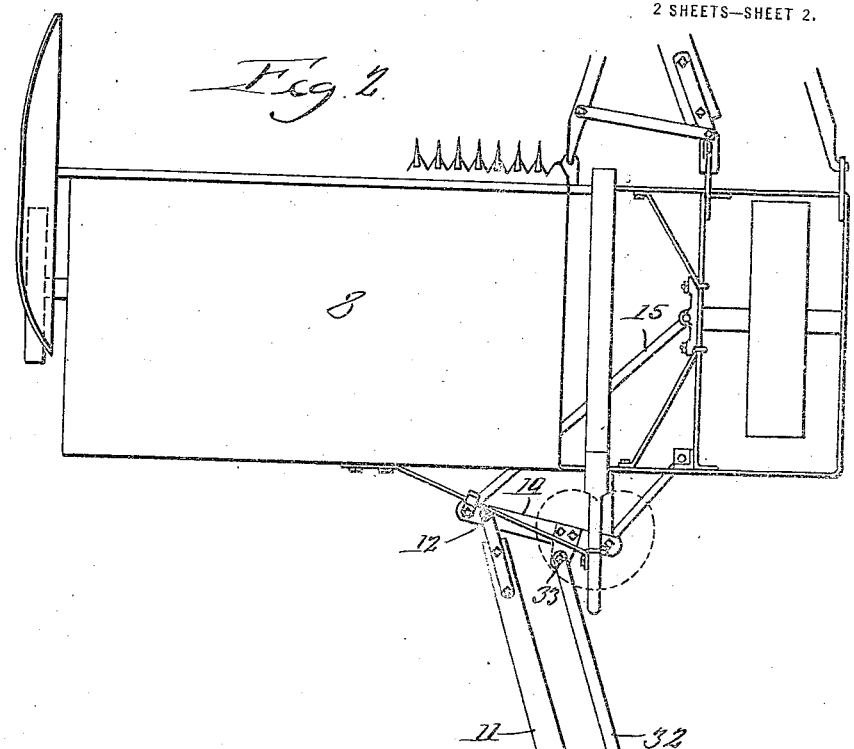
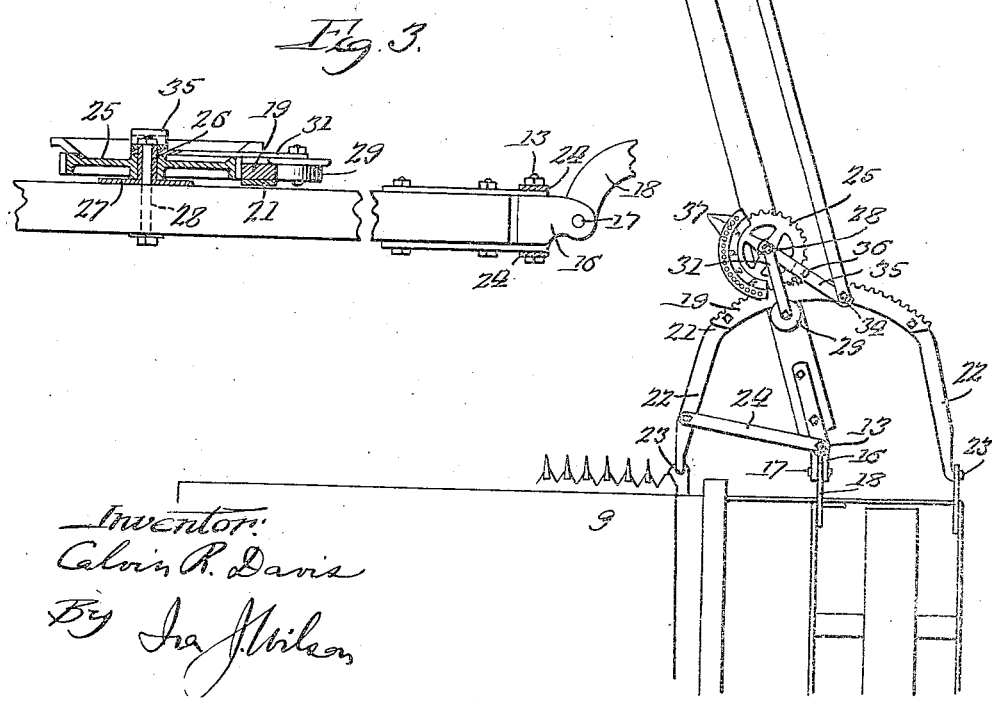

CALVIN R. DAVIS, OF ROCKFORD, ILLINOIS, ASSIGNOR TO EMERSON-BRANTINGHAM COMPANY, OF ROCKFORD, ILLINOIS, A CORPORATION OF ILLINOIS.

COUPLING FOR TRAINS OF BINDERS, MOWERS, AND OTHER VEHICLES.

1,422,186.               Specification of Letters Patent.        Patented July 11, 1922.

Application filed July 18, 1919.  Serial No. 311,828.

*To all whom it may concern:*

Be it known that I, CALVIN R. DAVIS, a citizen of the United States, residing at Rockford, in the county of Winnebago and State of Illinois, have invented certain new and useful Improvements in Couplings for Trains of Binders, Mowers, and Other Vehicles, of which the following is a specification.

This invention pertains in general to vehicle trains, and has more particular reference to the coupling between vehicles, especially agricultural implements, such for example as mowers and binders.

The primary object of the present invention is to provide a novel draft coupling between a front and rear implement for maintaining them in laterally offset relation and for causing the rear implement to turn in the opposite direction from the front implement when turning a corner. And a further important object is the provision of an automatic draft coupling of this character, which permits the rear implement to be positioned in trailing alignment with the front implement and at the same time guided in the aforesaid manner when turning corners.

I have also aimed to provide an automatic draft coupling possessing the characteristics just mentioned and which shall be constructed in such simple manner and of so few parts as to serve the desired purposes in a thoroughly practical and satisfactory manner and be capable of economical production.

In furtherance of these general objects, my invention contemplates the provision of a draft coupling including a segmental rack attached to the rear vehicle, a tongue or draft bar interposed between and connecting the front and rear vehicles, a gear carried by the draft bar and in mesh with the rack, and means operative between the front vehicle and the gear for controlling from the front vehicle through the gear and rack, the working position of the rear vehicle. This organization of parts also includes provision for adjustment between the gear and the means which operates the gear from the front vehicle for properly positioning the rear vehicle in any of a plurality of offset positions according to the width of cut, or for positioning the rear vehicle in trailing alignment with the front vehicle.

Other objects and attendant advantages resulting from features of the construction will be appreciated as the invention becomes better understood by reference to the following description when considered in connection with the accompanying drawings, in which—

Figure 1 is a plan view of a front and rear vehicle connected together in laterally offset relation, by a coupling embodying my improvements;

Fig. 2, a plan view showing the vehicles in trailing alignment;

Fig. 3, a sectional view taken on the line 3—3 of Fig. 1.

In illustrating my improvements, I have taken as an example a pair of grain binders which are to be coupled together in trailing relation, either offset or aligned. It should be understood, however, that my improvements are in no way limited to use in connection with binders, as they are equally well adapted to mowers or any other implement or vehicle for connecting them in the trailing relation contemplated by this invention. As shown in Fig. 1, the front and rear binders or vehicle frames are designated generally by characters 8 and 9. The front binder might be attached directly to and be drawn by a tractor or drawn from a preceding vehicle by means of an automatic coupling, such as provided by the present invention. The principal draft connection between the binders 8 and 9 is through the agency of a draft bar or tongue 11 pivotally connected at its front end 12 to the front binder and at its rear end 13 to the rear binder. The connection at the front end may be suitably established, as for example, by connecting the tongue at 12 to a cross bar 14, in turn rigidly attached to the frame structure. In order that the line of draft shall be carried in a direct manner through the stronger and heavier frame parts, I have provided a draft connection 15 between the cross bar 14 and the main frame of the binder forwardly thereon, as plainly shown. The front and rear binders are thus movable relatively to the tongue about the vertical pivots 12 and 13, and it will be noted that the connection of the tongue at its rear end to the rear binder includes a bracket 16 having a horizontal pivotal connection 17 with a rigid frame part 18, thus permitting the forward end of the tongue to swing vertically about the horizontal pivot 17.

Coming now to the means actuated automatically from the front binder for controlling the position of the rear binder, it will be noted that I have provided a segmental rack 19 concentric with the pivot 13 and supported in this instance by a hound 21, which conforms to the shape of the rack and has side arms 22 pivotally attached to the frame of the vehicle 9 at 23, in alignment with the pivot axis 17. In this case, the rack 19 is bolted to the hound bar 21 and the latter overlies the tongue, as shown. Stay bars 24 at the top and bottom of the bracket 17 serve to prevent lateral displacement of the pivot 13. Upon the tongue 11, I mount a gear designated generally by character 25, in mesh with the rack 19, and in the present instance it will be noted that the gear is mounted to revolve about the upstanding spindle 26 of a plate 27 which is secured to the tongue by means of the bolt 28. To prevent unmeshing of the gear by relative movement between the tongue and rack when draft is imposed, I provide a roller 29 engaging the back of the rack and connected in permanent relation to the gear by means of the connecting link 31.

My invention contemplates the provision of means operative between the front binder and gear 25 for imparting such movement to this gear as will control from the front binder the working position of the rear binder and the proper turning of the latter with respect to the former when turning a corner. This means consists in the present instance of a reach bar 32 laterally offset from and in parallel relation to the tongue 11 and pivotally connected at its front end 33 to the cross bar and at its rear end 34 to the outer end of an arm 35, which is pivotally connected at its inner end concentric with the gear 25. This arm 35 has a bolt connection 36 with the gear so that the arm and gear are in effect an integral part.

With the draft coupling in the relation shown in Fig. 1, the front and rear binders will be maintained in laterally offset relation during straight-way travel. When, however, the front binder is turned, the reach bar 32 will be moved lengthwise relatively to the draft bar or tongue 11, thus oscillating the gear 25, which in turn will oscillate the rear binder about the pivot 13. The effect is to turn the rear binder in the opposite direction from that in which the front binder is turned. For example, when the front binder is turned to the left at a corner, the reach bar 32 will be swung forwardly relatively to the frame, due to the pivot 33 traveling forwardly about the pivot 12, thus causing the gear 25 to be oscillated in a counterclockwise direction. The gear 25 in turn will oscillate the rack 19, and consequently the rear binder, about the pivot 13 in a clockwise direction, thus automatically turning the rear binder in the opposite direction from that in which the front binder is turned and causing the rear binder to swing out and make the turn at the proper time instead of cutting short as in cases where no control is provided, or instead of relying upon an individual manually controlled steering device, as is sometimes provided.

It will be noted that I have shaped the gear casting to provide a series of circumferentially spaced bolt holes 37 in any one of which the bolt 36 may be inserted for connecting the arm 35 in the corresponding position. It will be observed that the casting is marked opposite certain of the bolts with numerals "5," "6," "7" and "8." These indicate the hole in which the bolt should be inserted when a binder having a 5, 6, 7, or 8 foot cut is being used. In the present case, each binder cuts a swath 7 feet wide and the bolt 36 is accordingly secured in the hole opposite No. 7. Any intermediate adjustment may obviously be made by fastening the bolt in any of the intermediate holes, and it will be manifest that the invention is in no way limited to this particular spacing and arrangement of the holes or numbering thereof, but contemplates broadly the provision of a gear with which a part corresponding to the arm 35 might be attached in any of a plurality of circumferentially spaced positions. Adjustment from one position to the other is made by removing the bolt 36 and swinging the rear binder about the pivot 13 until the bolt hole in the arm 35 registers with the desired hole 37.

My invention also contemplates positioning the rear binder in trailing alignment with the front binder, and automatically controlling from the front binder the position of the rear binder in a fashion similar to the control when the rear binder is offset as described above. To this end and also for the purpose of obtaining the wide range of offset adjustments of the rear binder, I employ a rack of a length substantially equal, and in the present case somewhat longer, than the circumference of the gear. Thus it is possible upon simply removing the bolt 36 to swing the rear binder in trailing alignment with the front binder as shown in Fig. 2, and upon reinserting the bolt 36 in the hole 38, an operative connection between the front and rear binders is immediately obtained, and the trailing binder will be properly guided when turning corners, in the same manner as explained above. In making this change, it will be especially noted that it is not necessary to dismantle the coupling or remove any of the working parts, since the only change required is to remove a single bolt such as 36, swing the binder about the pivot 13 until the bolt 36 can be inserted in the hole 38 provided for transportation purposes.

It is believed that the foregoing conveys a clear understanding of the principles and objects of my invention, that the construction and organization of parts is exceptionally simple and practical for the purposes in mind, and that while I have illustrated and described but a single working embodiment, it should be understood that various changes might be made in the construction and arrangement without departing from the spirit and scope of the invention as expressed in the appended claims, in which—

I claim:

1. A draft coupling of the character described between a front and rear vehicle comprising a segmental rack attached to the rear vehicle, a tongue pivotally connected at its front and rear ends with the front and rear vehicles respectively, a gear carried by the tongue and in mesh with said rack, a roller carried by the tongue in cooperation with the back of the rack, a connection between the roller and gear holding these parts against displacement longitudinally of the tongue, and a connection between the front vehicle and gear for imparting movement to the latter to control the position of the rear vehicle from the front vehicle.

2. The combination with a front and rear vehicle, of a draft coupling therebetween comprising a segmental rack attached to the rear vehicle, a tongue pivotally connected at its front and rear ends with the front and rear vehicles respectively, a gear in mesh with the rack, means operative between the front vehicle and said gear for oscillating the latter when the front vehicle is turned, a roller engaging the back of the rack, and means connecting the roller and gear, holding them in associated relation with the tongue and preventing relative movement of said gear and rack lengthwise of the tongue.

3. A draft coupling of the character described between a front and rear vehicle comprising a segmental rack attached to the rear vehicle, a draft bar pivotally attached at its front end to the front vehicle and at its rear end to the rear vehicle concentric with said rack, a gear associated with the draft bar and in mesh with said rack, and means operative between the front vehicle and the gear, and adapted to be connected to the gear at a plurality of concentrically disposed points on the gear for controlling the position of the rear vehicle from the front vehicle, both when the rear vehicle is in laterally offset or working relation with the front vehicle and in trailing alignment therewith.

4. A draft coupling of the character described between a front and rear vehicle comprising a segmental rack attached to the rear vehicle, a draft bar tongue pivotally connected at its front end with the front vehicle and at its rear end with the rear vehicle concentric with said rack, a gear pivotally mounted on the draft bar and in mesh with said rack, an arm pivotally connected at one end with the draft bar concentric with the gear, a second draft bar substantially parallel to and laterally offset from the first draft bar and pivotally connected at its front and rear ends with the front vehicle and the opposite end of said arm respectively, and means for connecting the arm rigidly to the gear at any of a plurality of circumferentially spaced points on the gear.

5. A draft connection of the character described between a front and rear vehicle comprising a segmental rack attached to the rear vehicle, a draft bar pivotally connected at its front and rear ends with the front and rear vehicles respectively, a gear carried by the draft bar and in mesh with said rack, and means operative between the front vehicle and the gear for controlling through said gear the position of the rear vehicle, said means having an adjustable connection with the gear, and the gear being constructed to provide a series of circumferentially spaced connection points for the attachment of said means for holding the rear vehicle in greater or less offset relation with respect to the front vehicle and providing an additional connection point for the attachment of said means for holding the rear vehicle in trailing alignment with the front vehicle

CALVIN R. DAVIS.